United States Patent [19]
Kudoh et al.

[11] Patent Number: 5,499,398
[45] Date of Patent: Mar. 12, 1996

[54] WRISTWATCH-TYPE SELECTIVE CALLING RECEIVER

[75] Inventors: Kazuhiro Kudoh, Tokyo; Hisami Nagai, Kakegawa, both of Japan

[73] Assignee: NEC Corporation, Tokyo, Japan

[21] Appl. No.: 276,394

[22] Filed: Jul. 18, 1994

[30] Foreign Application Priority Data

Jul. 16, 1993 [JP] Japan .................. 5-175812

[51] Int. Cl.⁶ .................................. H01Q 7/00
[52] U.S. Cl. .................. 455/290; 455/344; 455/348; 455/351; 343/702; 343/718; 343/744; 343/868
[58] Field of Search .................. 455/89, 90, 193, 455/274, 280–287, 290, 344, 351, 348, 349, 100; 343/718, 702, 868, 866, 870, 744; 368/10, 205; 340/825.44, 311.1; 224/164–170, 173–180, 219, 267; H01Q 1/240, 7/00, 1/440

[56] References Cited

U.S. PATENT DOCUMENTS

| | | | |
|---|---|---|---|
| 2,418,865 | 9/1949 | Penfold ......................... | 224/176 |
| 4,586,827 | 5/1986 | Hirsch et al. .................. | 455/351 |
| 4,922,260 | 5/1990 | Gaskill et al. ................ | 343/718 |
| 5,128,686 | 7/1992 | Tan et al. ...................... | 343/744 |
| 5,132,697 | 7/1992 | Tan ................................ | 455/351 |
| 5,280,645 | 7/1994 | Nguyen et al. ............... | 455/274 |

FOREIGN PATENT DOCUMENTS

| | | | |
|---|---|---|---|
| 915716 | 10/1945 | France ........................... | 224/176 |
| 62-262529 | 11/1987 | Japan . | |
| 08404 | 7/1990 | WIPO . | |

*Primary Examiner*—Andrew I. Faile
*Attorney, Agent, or Firm*—Sughrue, Mion, Zinn, Macpeak & Seas

[57] ABSTRACT

A selective calling receiver comprises two separate bands having an antenna circuit for tuning incorporated therein. The first band has a first antenna and tuning capacitors incorporated therein and stoppers formed and arrayed on the outer surface thereof. Predetermined points are provided to the first antenna, providing different effective antenna lengths, respectively. The respective stoppers are provided with electrodes which are connected to the predetermined points of the first antenna through the tuning capacitors, respectively. The second band has a second antenna and a hook. The hook can be engaged with a selected one of the stoppers of the first band depending on the user's wrist thickness. The hook comprises a conductor electrically connected to the second antenna. When engaged with a selected one of the stoppers, the hook brings into electrical contact with the corresponding electrode to form the antenna circuit.

10 Claims, 5 Drawing Sheets

5,499,398

WRISTWATCH-TYPE SELECTIVE CALLING RECEIVER

BACKGROUND OF THE INVENTION

1. Field of the Invention

The present invention relates to a selective calling receiver which is capable of selectively receiving calling radio signals and, more specifically, to a wristwatch-type selective calling receiver attached to a pair of bands worn about the wrist of a user, each band having an antenna contained therein.

2. Prior Art

In a wristwatch-type selective calling receiver, since an antenna circuit is incorporated in the bands, the antenna length, or the inductance of the antenna circuit, varies with the wrist thickness of a user, resulting in a variation of the tuning frequency. Since the radio frequency used in a selective calling radio system is fixed, the above type of selective calling receiver can be used only by users whose wrists are in a certain limited diameter range.

A selective calling receiver for solving the above problem is disclosed in Japanese Patent Application Unexamined Publication No. Sho 62-262529. This selective calling receiver 20 has a means for recognizing an antenna length and a control circuit for selecting an optimum one from tuning capacitors based on the recognized antenna length by operating switching devices. The antenna length is recognized by means of an electrical contact provided by a clasp connecting the two bands or by inputting a location of a band connection point. In this manner, the antenna circuit can be tuned to the radio frequency irrespective of the user's wrist thickness.

However, in the conventional selective calling receiver above-mentioned, the control circuit is necessary for identifying the antenna length and operating the switching devices, resulting in complicated circuit configuration and increased cost of manufacturing. Further, because of the necessity of the control circuit and switching devices, the conventional calling receiver consumes excessive power undesirable for a portable device.

SUMMARY OF THE INVENTION

An object of the present invention is to provide a selective calling receiver which has a simple configuration but can provide the best receiving sensitivity regardless of a user's wrist thickness.

Another object of the invention is to provide a selective calling receiver which consumes less power but can provide the best receiving sensitivity regardless of a user's wrist thickness.

A selective calling receiver according to the present invention is comprised of two separate bands having an antenna circuit for tuning incorporated therein.

The first band is comprised of a first antenna that extends longitudinally and is electrically connected to a receiving circuit. In the first antenna, a plurality of points are predetermined providing different effective antenna lengths, respectively, depending on the wrist thickness of a user.

The first band is provided with a plurality of electrodes arrayed longitudinally in a line on the outer surface thereof. Preferably, the respective electrodes are provided in the stoppers formed and arrayed longitudinally in a line on the outer surface of the first band.

The respective electrodes are connected to the predetermined points of the first antenna through a plurality of tuning elements, respectively. The respective tuning elements cancel out the differences in effective antenna length of the first antenna in order to maintain the best receiving sensitivity regardless of a user's wrist thickness. The tuning element is preferably a capacitor, especially a ceramic capacitor.

The second band is comprised of a second antenna electrically connected to the receiver and a connection means (e.g. a hook). The hook can be engaged with a selected one of the stoppers of the first band depending on the user's wrist thickness. The hook is comprised of a conductor provided at a predetermined location of the second band and electrically connected to the second antenna. When the hook is engaged with a selected one of the stoppers, the conductor brings into electrical contact with the corresponding electrode.

DESCRIPTION OF THE PREFERRED EMBODIMENTS

In the following, an embodiment of the present invention will be described in detail with reference to the accompanying drawings.

Figure 1A:
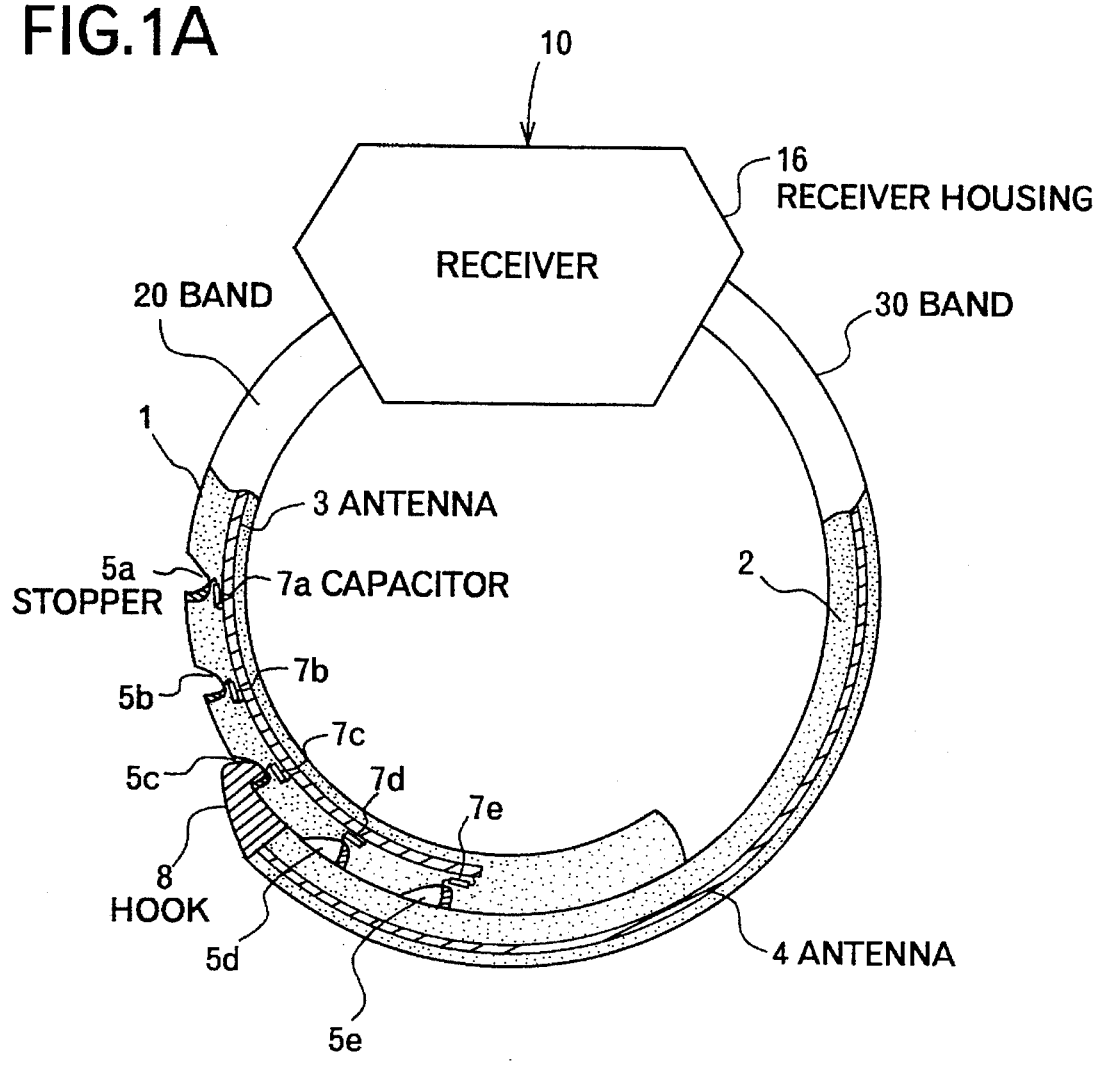
FIG. 1A is a schematic side view partly in section showing a structure of a selective calling receiver of an embodiment according to the present invention.

Referring to FIG. 1A, a selective calling receiver according to the present invention is comprised of a receiver 10 and bands 20 and 30. The bands 20 and 30 are connected to a receiver housing 16 at both sides. The bands 20 and 30 are respectively made of molded bodies 1 and 2 in which antennas 3 and 4 are incorporated. One end of the antenna 3 is electrically connected to the receiver 10, and one end of the antenna 4 is electrically connected to the receiver housing 16.

The band 20 is provided with a plurality of stoppers 5a–5e at approximately equal intervals on its outer surface. Each of the stoppers 5a–5e is shaped into a recess which can engage with a hook 8 provided at the end of the band 30. The bands 20 and 30 are joined in a ring form by engaging the hook 8 with one of the stoppers 5a–5e. Therefore, a user can wear the selective calling receiver around the wrist by engaging the hook 8 with a selected stopper on the band 20 suitable to the wrist thickness.

Figure 1B:
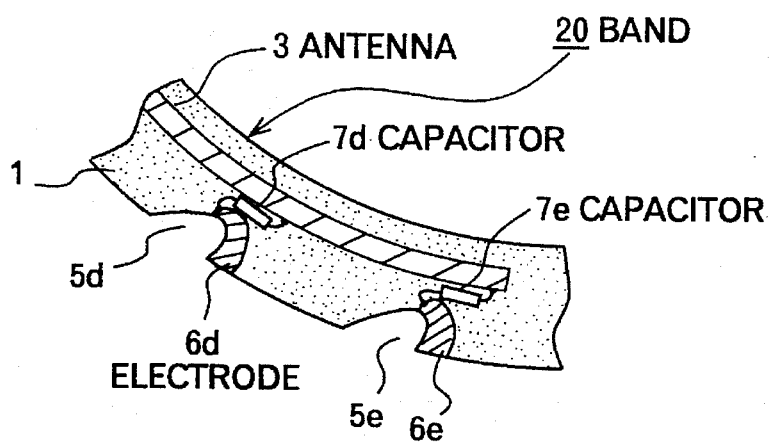
FIG. 1B is a schematic enlarged sectional view showing a stopper's portion of a band in the calling receiver of FIG. 1A.

As shown in FIG. 1B, the respective stoppers 5a–5e are provided with electrodes 6a–6e on the recess surfaces. The electrodes 6a–6e are electrically connected to the antenna 3 at corresponding locations through capacitors 7a–7e, respectively. The antenna 3, the electrodes 6a–6e, and the capacitors 7a–7e are incorporated in the body 1 of the band 20. Capacitors 7a–7e are comprised of a ceramic capacitor.

The antenna 4 in the other band 30 is electrically connected to the hook 8. Therefore, by engaging the hook 8 with, for instance, the stopper 5c (FIG. 1A), the antenna 3 is connected to the antenna 4 through the capacitor 7c to form a single antenna circuit. If the hook 8 is engaged with another stopper, an antenna circuit is formed through the corresponding capacitor.

The respective bodies 1 and 2 of bands 20 and 30 are made of a soft material having a relatively low expansibility or contractility such as natural rubber or silicone rubber. The body 1 protects the antenna 3, electrodes 6a–6e and capacitors 7a–7e, and the body 2 protects the antenna 4.

Figure 2:
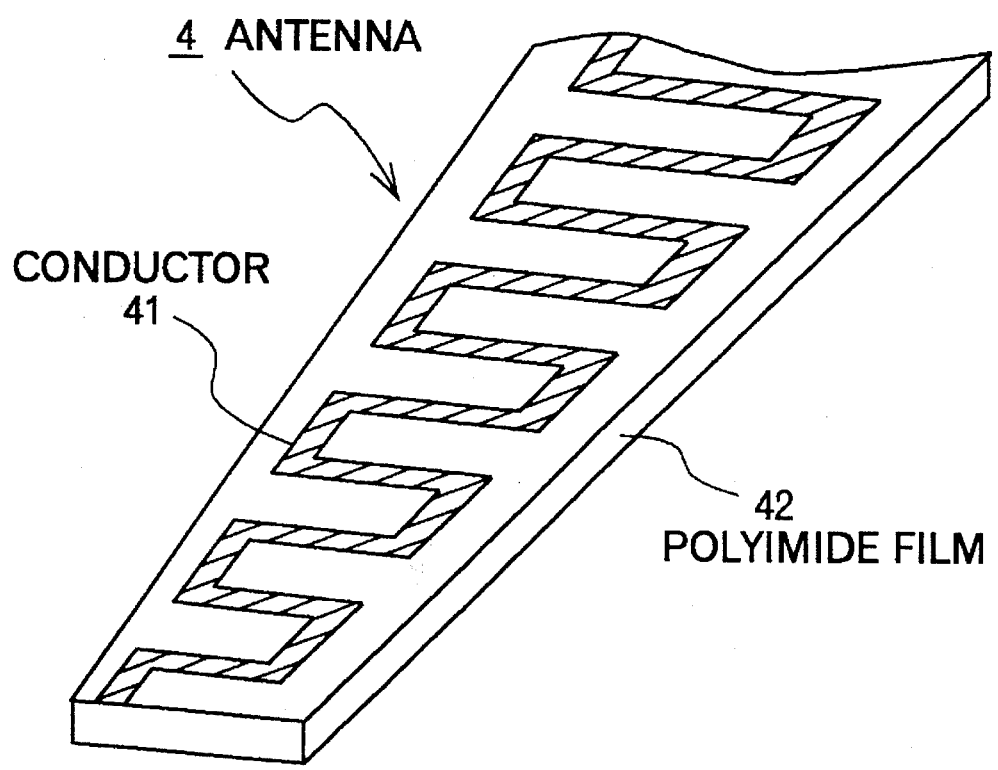
FIG. 2 is a schematic perspective view showing a part of an antenna according to the present embodiment.

FIG. 2 is a schematic perspective view of the antenna 4 used in this embodiment. The antenna 4 is comprised of a flexible printed board where a conductor 41 serving as an antenna is formed in a meandering line on a polyimide film 42. The band 30 is formed by putting the antenna 4 between separately molded top and bottom halves of the body 2 and then thermally bonding these halves.

Similarly, the antenna 3 of the band 20 is comprised of a flexible printed board where a conductor is formed in a meandering line on polyimide film. As shown in FIG. 1B, one lead of capacitors 7a–7e is connected to the conductor of the antenna 3 at equal intervals, and the resulting structure is covered with the body 1. Then, the stoppers 5a–5e are formed on the outer surface of the body 1. Further, electrodes 6a–6e are formed on the recess surfaces of stoppers 5a–5e such that the electrodes are connected to other lead of capacitors 7a–7e.

Figure 3:
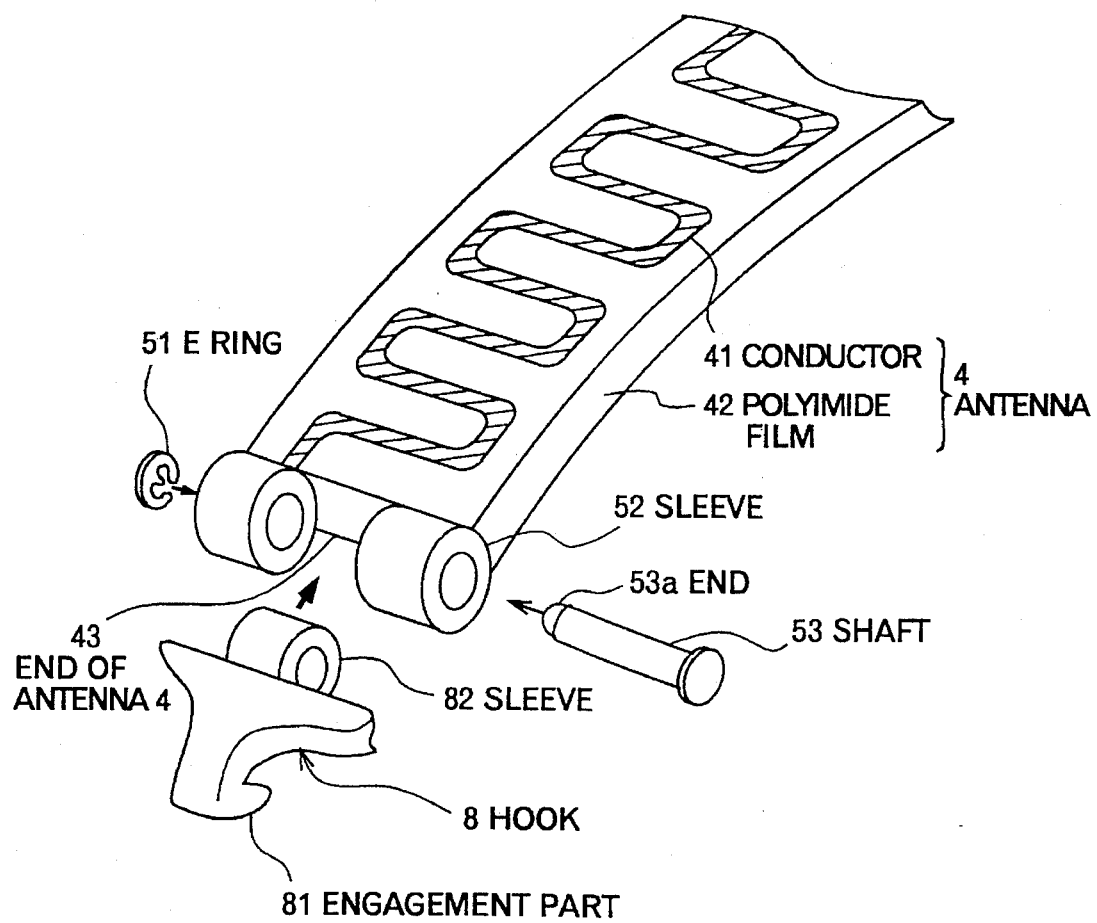
FIG. 3 is an exploded perspective view showing a connection structure for a hook and an antenna of the present embodiment.

As illustrated in FIG. 3, a conductive sleeve 52 whose center is cut away is fixed to an end 43 of the antenna 4 with conductive adhesive, thus being electrically connected to the conductor 41 of the antenna 4. The hook 8 is comprised of an engagement part 81 to fit into any stopper of the band 20 and a sleeve 82 to be connected to the sleeve 52 of the antenna 4. The hook 8 is joined to the antenna 4 such that the sleeve 82 of the hook 8 is put to occupy the central cutaway portion of the sleeve 52, a shaft 53 is inserted into a bore that is common to those sleeves, and an E ring 51 is attached to an end 53a of the shaft 53. Thereafter, as described above, the antenna 4 is covered with the body material to complete the band 30.

Figure 4:
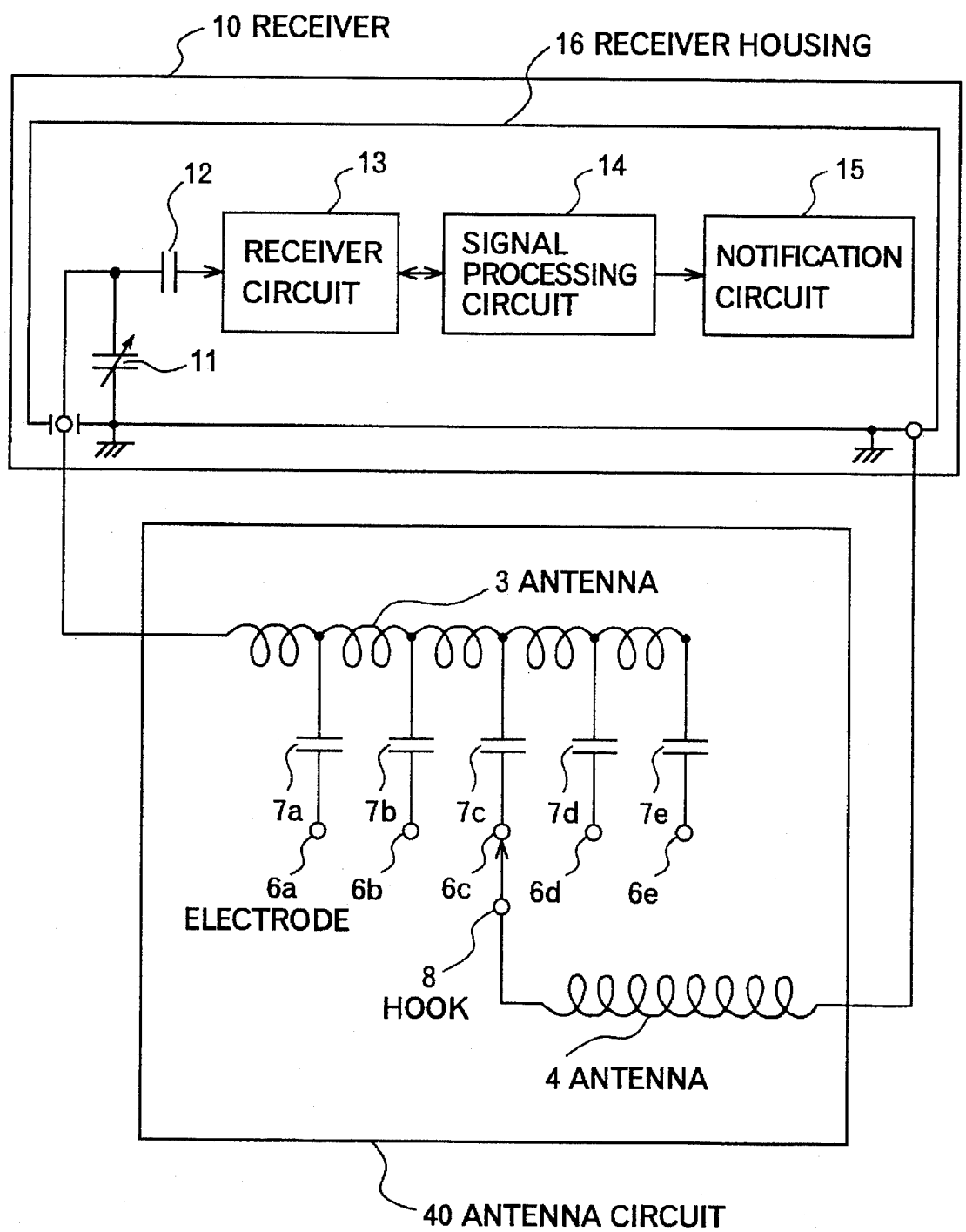
FIG. 4 is a circuit diagram of the receiver and the antenna circuit of the present embodiment.

As shown in FIG. 4, the antenna circuit 40 is comprised of the antenna 3, the electrodes 6a–6e of stoppers, the capacitors 7a–7e, the hook 8, and the antenna 4, all of which have been shown in FIG. 1A. Each of the antennas 3 and 4 is represented with an inductance, and the electrodes 6a–6e and hook 8 are represented with a switch.

One terminal of the antenna 3 is electrically connected to an input terminal of the receiver 10, and the other terminals are respectively connected to the electrodes 6a–6e through the capacitors 7a–7e connected to the antenna 3 at equal intervals (FIG. 1A). When the hook 8, which is connected to one terminal of the antenna 4, is engaged with one of the stoppers 5a–5e, the antennas 3 and 4 are connected to each other through the corresponding capacitor. In FIG. 1A where the hook 8 is engaged with the stopper 5c, the antenna 4 is connected to the antenna 3 through the capacitor 7c. The other terminal of the antenna 4 is connected to the receiver housing 16.

The antenna circuit 40 and a variable capacitor 11 in the receiver 10 constitute a tuning circuit and determine tuning frequency f2. A radio signal of a paging system received by the antenna circuit 40 is input to a receiving circuit 13 through the input terminal of the receiver 10 and a capacitor 12, and is demodulated in the receiving circuit 13. When the demodulated data includes a selective calling signal coincident with the calling signal of the receiver 10 itself, a signal processing circuit 14 operates a notification circuit 15 to generate a beep sound, vibration, etc.

In paging systems, the NTT (Nippon Telegraph & Telephone) and POCSAG (Post Office Code Standardization Advisory Group) schemes are both used in Japan, and the POCSAG scheme is used abroad including in the United States. In Japan, the 150 MHz band, for example, is used as a transmission radio frequency f1, and in the United States, the 280 MHz band is used.

As described above, which of the electrodes 6a–6e is actually engaged with the hook 8 depends on the user's wrist thickness. If, for instance, the hook 8 is connected to the electrode 6c, the tuning frequency f2 is determined by a tuning circuit consisting of the inductance of the antenna 4, the inductance formed by the hook 8, the electrode 6c, the capacitor 7c, and the part of the conductor of the antenna 3 from the connection point of the receiver 10 to the point at which the capacitor 7c is connected, and the variable capacitor 11 in the receiver 10. At this tuning frequency f2 the antenna circuit 40 exhibits maximum antenna gain. The tuning frequency f2 is determined similarly when the hook 8 is connected to another electrode.

The selective calling receiver can obtain the maximum receiving sensitivity by equalizing the tuning frequency f2 to the transmission frequency f1 of the paging system. Therefore, to obtain the maximum receiving sensitivity regardless of which of the electrodes 6a–6e is engaged with the hook 8, the capacitances of capacitors 7a–7e must be set to vary with the inductances of the parts of the antenna 3, the respective points connecting to the capacitors 7a–7e. For users with thinner wrists, the hook 8 is connected to an stopper closer to the receiver 10 and, accordingly, the effective conductor length (i.e., antenna length) of the antenna 3 is reduced. Therefore, the capacitance of the capacitor 7a, connected to the electrode 6a, should be set at a maximum value, and the capacitance of the capacitor 7e, connected to the electrode 6e, should be set at a minimum value. More specifically, the capacitances Cx (x=a, b, c, d or e) are set to satisfy $$f1 = f2 = \frac{1}{2\pi \sqrt{(L4 + L3 - (n-1)Ls)(C11 + Cx)}}$$

where f1 is the transmission frequency of the paging system, f2 is the tuning frequency of the receiver 10, C11 is the capacitance of the variable capacitor 11, L3 is the inductance of the antenna 3 from the connecting point to the variable capacitor 11 to the connecting point to the capacitor 7e, L4 is the inductance of the antenna 4 and hook 8, and Ls is the inductance of the section of the antenna 3 between the adjacent ones of the capacitors 7a–7e which are connected to the antenna 3 at equal intervals. Further, n is an integer from 1 to 5, and indicates one of the connecting points (electrodes 6e to 6a) to the hook 8. For example, n=1 indicates connection to the electrode 6e, and n=5 indicates connection to the electrode 6a. By setting the capacitances of capacitors 7a–7e in the above manner, the maximum receiving sensitivity can be always obtained no matter which of stoppers is selected depending on the wrist diameter of a user.

Figure 5:
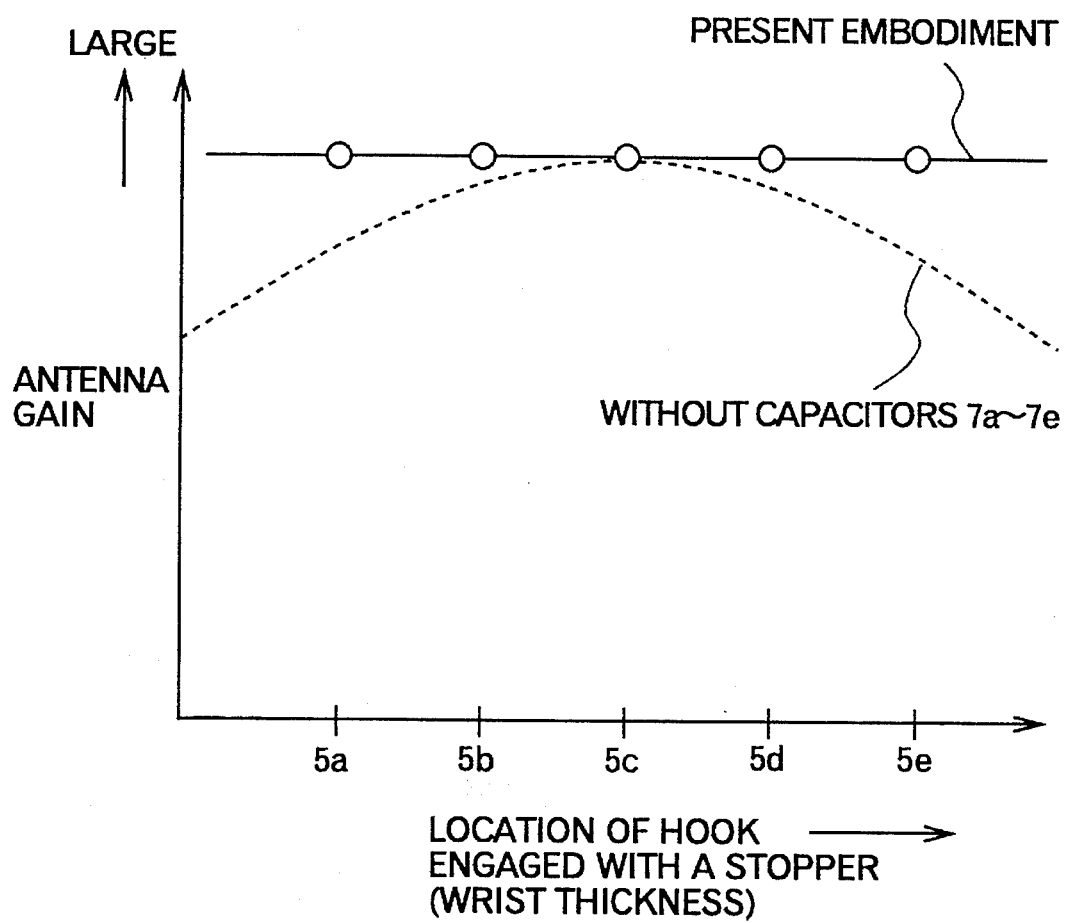
FIG. 5 is a graph showing an antenna gain characteristic of the present embodiment.

FIG. 5 is a graph showing a relationship between hook location and antenna gain. As shown by a solid line in FIG. 5, the present embodiment keeps the antenna gain at the maximum over the entire range of location of the hook 8. However, if an antenna tuning circuit is constituted without using capacitors 7a–7e such that the antenna 3 is directly connected to one of the electrodes 6a–6e with a sole adjustment of the variable capacitor 11, the maximum antenna gain is obtained only when the hook 8 is connected to a certain stopper (e.g., 5c) and the antenna gain drops when the hook 8 is connected to the other stopper, as shown by a dashed line.

Since the inductances L3 and L4 of the antennas 3 and 4 are about 3 to 4 nH, a capacitance required for the capacitor 7a that should have the maximum capacitance is less than 200 pF even at a radio frequency f1 of 150 MHz. Therefore, if ceramic capacitors are employed for capacitors 7a–7e, they can be accommodated in the band 20 without causing any problem in terms of dimensions and reliability.

The receiver 10 and bands 20 and 30 may be connected by using a known technique such as connection with a shaft. A double stopper mechanism can easily be implemented to prevent release of the hook between the hook 8 and one of the stoppers 5a–5e.

As described above, in the selective calling receiver according to the present invention, the hook connected to the antenna is provided in one band and a plurality of stoppers are provided in the other band, and the tuning capacitors for obtaining the maximum antenna gain are connected to the respective stoppers. Therefore, the maximum receiving sensitivity can be obtained when the hook is connected to any stopper, i.e., irrespective of the user's wrist thickness.

In the selective calling receiver according to the present invention, since the antenna circuit with maximum gain can be formed simply by engaging the hook with one of the stoppers, a control circuit and switching element for selecting an optimum capacitor are not necessary. Therefore, there can be attained reduced power consumption and simplification of the circuit configuration and reduced manufacturing cost.

We claim:

1. A selective calling receiver comprising a receiver, a first band, and a second band, the first and the second bands being connected to the receiver at both sides, the first band comprising:
   a first antenna extending longitudinally and being electrically connected to the receiver, the first antenna comprising a plurality of points providing different effective antenna lengths, respectively;
   first connection means for connecting the first band and the second band in a ring form, the first connection means comprising a plurality of electrodes arrayed longitudinally in a line on the outer surface of the first band; and
   a plurality of tuning elements elements electrically connected between the electrodes and the points of the first antenna, respectively, for cancelling out the differences in effective antenna length of the first antenna, and the second band comprising:
   a second antenna electrically connected to the receiver; and
   second connection means capable of being engaged with the first connection means to connect the first band and the second band in a ring form, the second connection means comprising a conductor provided at a predetermined location of the second band and electrically connected to the second antenna, and the conductor being in electrical contact with a selected one of the electrodes with the second connection means being engaged with the first connection means, wherein
   the first connection means comprises a plurality of stoppers, said stoppers comprising recesses arrayed longitudinally in a line on the outer surface of the first band so as not to penetrate through the first band, the electrodes being provided, respectively, within each of the recesses; and
   the conductor of said second connection means comprises a hook which is engaged within a selected one of the recesses of the first connection means so that the first and second connection means are secured together, the hook being in electrical contact with the electrode provided in the recess.

2. The selective calling receiver as set forth in claim 1, wherein the tuning elements each comprise a capacitor.

3. The selective calling receiver as set forth in claim 2, wherein the capacitors have capacitances that cancel out the differences in the effective antenna length.

4. The selective calling receiver as set forth in claim 2, wherein the capacitors each comprise a ceramic capacitor.

5. A selective calling receiver comprising a receiver, a first band, and a second band, the first and the second bands being connected to the receiver at both sides, the first band comprising:
   a first antenna extending longitudinally and being electrically connected to the receiver, the first antenna comprising a plurality of points providing different effective antenna lengths, respectively;
   a plurality of stoppers arrayed in the longitudinal direction on the outer surface of the first band, said stoppers each comprising a recess formed in the outer surface of the first band so as not to penetrate through the first band, each of the recesses having an electrode provided therein; and
   a plurality of tuning capacitors electrically connected between the electrodes and the points of the first antenna, respectively, for maintaining a tuning frequency at a predetermined frequency regardless of the differences in effective antenna length of the first antenna, and the second band comprising:
   a second antenna electrically connected to the receiver; and
   a conductive hook electrically connected to said second antenna, said hook being engaged within one of the recesses to electrically contact the electrode within said one of the recesses, and to connect the first band and the second band in a ring form.

6. The selective calling receiver as set forth in claim 5, wherein, the respective capacitors have capacitances that cancel out the differences in effective antenna length.

7. The selective calling receiver as set forth in claim 5, wherein the capacitors each comprise a ceramic capacitor.

8. A selective calling receiver comprising a receiver having a variable capacitor, a first band, and a second band, the first and the second bands being connected to the receiver at both sides, the first band comprising:
   a first antenna extending longitudinally and being electrically connected to the receiver, the first antenna comprising a plurality of points providing different effective antenna lengths, respectively;
   a plurality of stoppers arrayed in the longitudinal direction on the outer surface of the first band, each of the stoppers having an electrode provided therein; and a plurality of tuning capacitors electrically connected between the electrodes and the points of the first antenna, respectively, for maintaining a tuning frequency at a predetermined frequency regardless of the differences in effective antenna length of the first antenna, and the second band comprising:

a second antenna electrically connected to the receiver; and a hook capable of being engaged with one of the stoppers to connect the first band and the second band in a ring form, the hook comprising a conductor provided at a predetermined location of the second band and electrically connected to the second antenna, and the conductor being in electrical contact with the electrode in a selected one of the stoppers, wherein the capacitances Cx of the tuning capacitors are set to satisfy the following equation:

$$f1 = f2 = \frac{1}{2\pi} * [\{L4 + L3 - (n-1) * Ls\} \{C11 + Cx\}]^{-0.5}$$

where f1 is a transmission frequency of a paging system, f2 is a tuning frequency of the receiver, C11 is a capacitance of the variable capacitor of the receiver, L3 is an inductance of the first antenna from a connecting point between the first and second bands to the variable capacitor and from the connecting point to a capacitor farthest from the receiver along the first band, L4 is an inductance of the second antenna and the hook, Ls is an inductance of a section of the first antenna between adjacent ones of the tuning capacitors, and n equals the total number of tuning capacitors minus the number of tuning capacitors between the connecting point and the receiver along the first band.

9. A selective calling receiver as recited in claim 1, wherein said recesses each comprise a substantially V-shaped notch, and wherein said hook comprises an engagement part which mates with the V-shaped notch to secure the first and second bands together.

10. A selective calling receiver as recited in claim 5, wherein said recesses each comprise a substantially V-shaped notch, and wherein said hook comprises an engagement part which mates with the V-shaped notch to secure the first and second bands together.

* * * * *